United States Patent
Terdy et al.

(10) Patent No.: US 12,525,909 B2
(45) Date of Patent: Jan. 13, 2026

(54) MOTOR DRIVE CIRCUITRY

(71) Applicant: ZF Automotive UK Limited, Solihull (GB)

(72) Inventors: Tamas Terdy, Birmingham (GB); Kevin Cockerham, Sutton Coldfield (GB)

(73) Assignee: ZF Automotive UK Limited, Solihull (GB)

( * ) Notice: Subject to any disclaimer, the term of this patent is extended or adjusted under 35 U.S.C. 154(b) by 192 days.

(21) Appl. No.: 18/406,503

(22) Filed: Jan. 8, 2024

(65) Prior Publication Data

US 2024/0235450 A1 Jul. 11, 2024

(30) Foreign Application Priority Data

Jan. 10, 2023 (GB) .................................... 2300328

(51) Int. Cl.
*H02P 25/18* (2006.01)
*H02P 23/14* (2006.01)
*H02P 25/22* (2006.01)
*H02P 29/40* (2016.01)

(52) U.S. Cl.
CPC ............. *H02P 25/18* (2013.01); *H02P 23/14* (2013.01); *H02P 25/22* (2013.01); *H02P 29/40* (2016.02)

(58) Field of Classification Search
CPC .......... H02P 25/18; H02P 23/14; H02P 25/22; H02P 29/40; H02P 25/16; H02P 27/06; B62D 5/04; B62D 5/0481; B62D 5/046; H02H 7/0844; H02H 7/0854

USPC .................. 318/400.22, 400.21, 400.01, 700
See application file for complete search history.

(56) References Cited

U.S. PATENT DOCUMENTS 9,231,465 B2 * 1/2016 Hara .................... B62D 5/0463
2012/0086373 A1 4/2012 Kudanowski et al.
2013/0113405 A1 5/2013 Baranyai

FOREIGN PATENT DOCUMENTS

WO 2016038362 A1 3/2016

* cited by examiner

*Primary Examiner* — David Luo
(74) *Attorney, Agent, or Firm* — Kristin L. Murphy

(57) ABSTRACT

A motor drive circuit comprising: a motor bridge, comprising a bridge arm comprising upper and lower switches for each motor phase, which may be selectively closed to modulate voltage applied to the respective phases to drive signals from a motor control circuit, at least one solid-state-phase-isolation-relay (SSPIR) provided in series in an electrical path connecting a respective phase of the motor to a respective bridge arm, the SSPIR being closed in normal operation so that current can flow in the phase and held open in a fault mode of operation to prevent current flow, a monitoring arrangement for monitoring a current waveform in the phase to identify when it is safe to open the SSPIR without causing damage to the SSPIR due to an avalanche mode, and a control circuit that applies a voltage to each SSPIR that is sufficient to hold the SSPIR closed in normal operation is only opened when the current is in a safe operational area.

14 Claims, 7 Drawing Sheets

MOTOR DRIVE CIRCUITRY

CROSS-REFERENCE TO RELATED APPLICATION

This application claims priority to GB Application No. 2300328.8, filed Jan. 10, 2023, the disclosure of which is incorporated herein by reference in its entirety.

TECHNICAL FIELD

This disclosure relates to improvements in motor drive circuitry, especially, but not exclusively, for use in electric steering assemblies, such as a steer by wire assembly.

BACKGROUND

Electric steering systems are known in which an electric motor applies assistance torque to a part of the steering to assist the driver of the vehicle in turning the wheel. The motor may typically act upon the steering column or may act upon the steering rack, through a reduction gearbox. A measurement of the torque applied to the steering apparatus by the driver when turning the wheel is passed to a processor which produces a torque demand signal which is in turn used to control the motor to produce the required assistance torque. Applying an assistance torque of the same sense as the driver applied torque reduces the amount of effort needed to turn the wheel.

In an alternative, the steering wheel may be decoupled from the road wheels with a motor provided primarily to apply a resisting torque to a steering column that gives the driver a natural feel when holding the steering wheel. An electric motor is coupled to the steering wheel and a processor like that required for an electric power assisted steering system provides a torque demand signal which is used to control the motor to provide the required resistance.

The motor, which may be a star or wye connected motor, such as a multiphase permanent magnet motor, is controlled by a motor control circuit and a motor drive circuit. The motor drive circuit comprises switches which can be opened and closed to connect the phases of the motor to a DC source, such as a battery or an earth, in response to a control pattern provided by the control circuit. Specifically, each phase is connected to a positive supply rail through a top transistor which when turned on connects the motor phase to a battery positive terminal connected to the positive supply rail. Similarly, each phase is connected through a bottom transistor to a negative supply rail through a bottom transistor. When switched on the bottom transistor connects the phase to the negative rail which is in turn connected to a battery negative or earth, The two transistors—top and bottom—form one arm of a multiple arm bridge circuit that is the heart of the drive circuit. By opening and closing the switches it is possible to selectively and independently route current through each phase of the motor.

The control circuit comprises a digital or analogue circuit or some combination of both. The function of the control circuit is to supply control signals to the bridge transistors to open and close them in a pattern which in turn causes the current to flow through the phases as required for a given motor torque and speed. Generally the pattern will be set by the control circuit according to the motor position and the torque measured in the steering system by a torque sensor. Typically the pattern for each arm of the bridge comprises a pulse width modulated waveform.

An example of a typical prior art motor and drive circuit 1 is shown in FIG. 1 of the drawings. A battery (not shown) supplies power to a 3 phase bridge with top switches 2, 3, 4 and bottom switches 5, 6, 7 which feed a 3 phase permanent magnet motor 8. The switches shown are MOSFETS but could be any other type of semiconductor switch such as Bipolar transistors. Where reference is made in this document to MOSFET devices the reader should understand that this is intended generally to cover any solid state relay or switch.

A problem with such an arrangement is that a fault mode can arise in which a top switch in an arm of the bridge and a bottom switch in another arm of the bridge may both be stuck in the closed position, resulting in a permanent path for DC current from the battery through the positive rail, through at least two phases of the motor and back to the negative rail. This can occur for many reasons, such as a fault in the control circuit resulting in a control pattern being applied to the drive circuit which is incorrectly instructing transistors to stay closed, or a faulty switch. When such a fault condition occurs the motor resists turning, making it difficult for the driver to turn the wheel.

To prevent the current being drawn from the supply along the path described in the previous paragraph, the remaining bridge switches on either the top or bottom side of the bridge could be placed in a fault mode where they are all turned OFF (i.e. open circuit). However, it is still possible for current to flow through the motor along a path as shown in FIG. 2 of the drawings. Due to the inductance of the motor, any current flowing in the fault mode will continue to flow through the faulty bridge switch and the body diodes of two other top or bottom MOSFETs—dependant on the direction of current flow.

With no other source present, this fault current will decay to zero as energy is dissipated in the resistance of the motor windings and over the forward voltage drop of the conducting MOSFET body diodes. This is shown in FIG. 3.

However, this situation does not adequately isolate the Motor; continued (unopposed) steering input from the driver will rotate the motor, generating a back-emf voltage between windings. As soon as this back-emf exceeds the forward voltage of the MOSFET body diode (top or bottom MOSFET alongside the faulty MOSFET) current will again flow giving a half-wave rectified periodic current waveform, resisting the actions of the driver (Motor Damping). This is shown in FIG. 4 of the drawings.

This is an unacceptable situation which must be rectified within a short duration set by the applicable safety requirement.

To ensure that current cannot flow due to back EMF Vbemf1,2 as the motor is physically rotated, for example by a driver, it is known to place in each motor phase an additional isolation switch referred to in this text as a solid state phase isolation relay (SSPIR). This term encompasses a range of solid-state switches including MOSFETS and bipolar transistors and their associated body diodes. When a fault has occurred, the drive circuit is placed in a fault event mode in which these switches are held open (non-conducting) to ensure no current can flow in the phase. A simple circuit with an isolation switch, herein referred to as a solid state phase isolation relay (SSPIR), in each phase, is shown in FIG. 5.

Although the use of SSPIRs would appear to be a perfect and total solution to the problem, the applicant has previously appreciated that an issue with an SSPIR arises when a SSPIR opens either intentionally or unintentionally whilst a high current is flowing through it. Under this circumstance, the voltage across the SSPIR will rise rapidly due to the increasing drain-source resistance in the moments before opening until the breakdown voltage of the switch is reached (avalanche condition). This combination of high voltage in the presence of high current flow results in a short high-power pulse. The energy contained within this pulse may result in the short-circuit failure of the SSPIR, defeating its purpose. This is shown in FIG. 6.

Several approaches have been proposed for preventing a short circuit failure of the SSPIR in a faulty motor phase. In a simple approach the system may simply wait for the current in the motor to decay before opening the SSPIRs. However, this is not a total solution to the problem of possible short-circuit failure of the SSPIRs.

In EP2112051B1 a system is described in which the SSPIRs are opened only at times when it is known that there is precisely zero current flowing in the phase or the current is flowing in the same direction as the body diode of the SSPIR device. By flowing in the same direction, we mean flowing in a direction in which the diode allows current to flow so that the diode is not reverse biased. Initiating the opening of the switch at this time mitigates the risk of a short circuit failure of the SSPIR. However, this does limit the time at which it can be opened to only one half period of the rectified current waveform produced due to back emf when the motor is rotating at its peak design speed. This can lead to a delay in a worse case of one half of the period before the opening of the SSPIR can be initiated.

SUMMARY

What is needed is to ameliorate the problems associated with the use of SSPIRs that are not overcome by the prior solutions outlined above.

According to a first aspect the disclosure, a motor drive circuit for use in driving a motor having two or more phases is disclosed. In one exemplary arrangement, the motor drive circuit comprises:
 a motor bridge having, for each phase of a motor, a bridge arm comprises an upper switch and a lower switch that in normal operation may be opened and closed to modulate a voltage applied to the respective phases in response to drive signals from a motor control circuit,
 at least one solid state phase isolation relay SSPIR that is provided in series in an electrical path connecting a respective phase of the motor to a respective bridge arm, the SSPIR being closed in normal operation so that current can flow in the phase and is held open in a fault mode of operation to prevent the flow of current in the phase,
 a monitoring arrangement for monitoring a current waveform in the phase to identify when the current is within a safe operational area in which it is safe to open the SSPIR without causing damage due to the SSPIR due to an avalanche mode, the safe operational area comprising a period of time in which both the current flowing in the motor phase is in the opposite direction to a body diode of the SSPIR and the magnitude of the current is below a safe threshold level, and
 a control circuit, that during normal operation applies a voltage to each SSPIR that is sufficient to hold the SSPIR closed and which reduces the voltage to cause the SSPIR to open, in which the motor drive circuit is arranged such that the SPPIR is only opened at a time when the current is in the safe operational area and not when the current flowing in the phase is both flowing in the motor phase in the opposite direction as the body diode of the SSPIR and the magnitude of the current is above a safe threshold level.

The disclosure therefore ensures that the SSPIR is not damaged on initial opening due to excessive power dissipation in the SSPIR, which is known to be a function of the product of the current that flows through the motor and the voltage dropped across the SSPIR. This is achieved by careful monitoring of the current waveform by the monitoring circuit to identify the safe operational area and the timing at which the SSPIR is to be opened. By performing the opening during a safe operating area in which the current is flowing in the opposite direction to a body diode can help reduce the wait time before the SSPIR can be opened. Furthermore, by providing for opening when the phase current is flowing in the opposite direction to the body diode of the SSPIR there is no need to wait until the current flows in the same direction as the body diode, increasing the speed of operation of the system in some cases.

The safe operational area may comprise a region of time at which the current in a phase is below a predefined threshold limit that is stored in a memory of the motor drive circuit. This may comprise a time when the current is rising or the current is decreasing so that there are two safe operational areas for each half cycle of the current waveform in the phase when the motor is rotating and generating an emf.

The monitoring arrangement may include a bridge monitor circuit the condition of the motor bridge to determine that a fault condition is present where a switch of the bridge is not operating correctly and in response outputs a fault signal that is fed to the current control circuit to initiate an opening of each SSPIR of the motor at the appropriate time when the conditions of the safe operational area are satisfied.

The bridge monitor circuit on detecting a fault may immediately output the fault signal and the monitoring arrangement may delay the time at which the fault signal is fed to the control circuit until the current in the phase of an SSPIR is in the safe operational area.

Where there is/are more than one SSPIRs, for example one in each phase of the motor, the monitoring arrangement may output a respective fault signal for every SSPIR. For a three-phase motor with three SSPIRs, three fault signals will be output and the timing of each may differ as the phase current in each phase will be different and hence the safe time to open each SSPIR will be different.

Where each phase is provided with a respective SSPIR, the monitoring arrangement may monitor the current waveform in each phase independently, so that the timing of the fault signals used to initiate the opening of each SSPIR is independent of the other SSPIRs. Opening of each SSPIR is done independently so they do not all have to open at the same time but only when safe to do so.

The control circuit may include a voltage clamp which is configured to clamp the voltage at the drain of the SSPIR to a safe level insufficient to cause failure of the SSPIR following the initiation of the opening of the SSPIR thereby extending the width of the safe operational area by increasing the maximum phase current at which the SSPIR can be safely opened.

The voltage at the drain may be clamped to a level below that which will cause damage to the SSPIR but above the maximum phase voltage that is expected due to the inductance of the load preventing a sudden interruption of the current flow. The instantaneous current flowing in the motor winding will want to keep flowing and as the SSPIR is trying to stop that current flow, the voltage generated by the inductor will be proportional to its inductance value and the rate of change of the current. A Zener clamp limits the voltage caused by unclamped inductive load switching across the SSPIR device. It achieves this voltage limiting effect by keeping the SSPIR partially turned-on. This is necessary not to reach the breakdown voltage of the MOSFET. The turn-off transition is still a high stress event for the device, but the dissipated energy will be spread out in time a bit more and the peak power dissipation is less.

A respective voltage clamp circuit may be associated with each SSIR that is non-operational prior to opening of the SSIR and is operational to limit the voltage drop between the source and drain of the SSPIR at least for a period of time commencing with the initiation of the opening of the SSPIR. By non-operational it is meant that it is not functioning as a clamp of the drain voltage.

The voltage clamp circuit may comprise at least one Zener diode which is connected in series between the drain and a gate of the SSPIR. By dropping the voltage to the gate to zero on initiation of an opening of the SSPIR, the Zener diode initially prevents the drain voltage rising above the gate voltage by more than a certain amount. Once the Zener voltage is exceeded, current starts to flow through the Zener into the gate which in turn keep the device partially turned on until the overvoltage spike decays. This helps to reduce stress and avoid failure of SSPIR.

The motor drive circuit may include an isolation arrangement for isolating the voltage clamp from the drain of the SPPIR after a predefined period of time has elapsed immediately following opening of the SSPIR.

Isolating the voltage clamp after a predetermined period of time has elapsed is beneficial because it allows a lower clamp voltage to be used, Having a lower clamp voltage is beneficial because this leads to a lower MOSFET current and voltage hence a lower peak power dissipation.

The isolation arrangement may include a switch in series between the voltage clamp and the drain of the SSPIR that is closed following an initiation of the SSPIR opening and is opened after the predefined period of time to isolate the voltage clamp from the drain of the SSPIR.

The switch may comprise a switch such as a MOSFET or similar device.

The control circuit may include an RC circuit that regulates the voltage applied to the gate of the MOSFET to hold it normally closed and where the time constant of the RC determines when the gate voltage drops to a level at which the MOSFET opens.

The RC circuit may include a capacitor that is normally held in a charged state when the SSPIR is held closed and discharges once initiation of the opening of the SSPIR at a rate set the RC constant of the RC circuit, the voltage across the capacitor of the RC circuit falling during discharge which cause the gate voltage of the MOSFET to fall thereby opening the MOSFET.

In normal operation the voltage applied to the gate of the SSPIR during normal operation may be used to hold the switch in the closed state.

The isolation arrangement may comprise a MOSFET. This may be connected between the capacitor terminal that is not connected to the gate of the SSPIR and the drain and may be normally closed.

The isolation arrangement may be configured to isolate the voltage clamp from the drain of the SSPIR at a time that is delayed from the opening of the SSPIR by an amount such that the current in the phase has commenced flowing in the same direction as the body diode and prior to the current being sufficient to cause a voltage at the gate of the SSPIR having reached a level that would accidentally close the SSPIR.

The motor phase current frequency will vary with motor speed. The delay must be sufficiently long that the drain of the SSPIR is clamped for the whole time that the SSPIR is between the two safe operational areas that are present in one half cycle of the waveform. The motor can rotate at different speeds in use when there is a fault, and to ensure the delay is appropriate the SSPIR may be opened only in a safe zone where the current is rising at motor speeds above a threshold speed, and may be opened only in a safe operational area when the current is falling at a speed below the threshold.

The monitoring circuit that monitors the current flowing in each phase may monitor the amplitude of the current either directly or indirectly. By directly we mean monitor the actual current and by indirectly we mean monitoring a parameter that varies as a function of the current such as a voltage at a part of the motor drive circuit.

The threshold of current that defines the upper end of the safe operational window may be stored in an area of memory that is part of the monitoring arrangement or accessible to the monitoring arrangement.

The threshold may have a fixed value, or may have a variable value that is varied as a function of one or more properties of the motor drive circuit or of the motor driven by the motor drive circuit. These may include the temperature of at least one part of the motor drive circuit or of the motor.

The control circuit may be configured to close the bridge switches in the upper side of the bridge (phase to positive supply rail) upon detection of a fault in one switch in the upper side, and may close the bridge switches in the lower side of the bridge (phase to positive supply rail) upon detection of a fault in one switch in the lower side. The control circuit may be configured to do this once a bridge fault has been detected but before initiating opening of any of the SSPIRs.

By a switch not operating correctly we mean that the switch is broken and is stuck closed, or that the switch is incorrectly being held closed by incorrect drive signals.

The control circuit may during normal use apply a voltage to the gate of the SSPIR to hold it closed and apply a reduced or zero voltage to initiate opening of the SSPIR.

In one convenient arrangement, the SSPIR control circuit may be configured to apply a voltage from a fixed voltage source to the gate (for a MOSFET) or base (for a bipolar transistor) of the SSPIR that is a considerable voltage above the supply voltage that is available to be applied the source of the SSPIR during normal operation of the motor to ensure that the SSPIR is closed. This ensures the SSPIRs allows current to flow through the phases to keep it closed even when the full supply voltage is present in the motor phase.

Note that in the case where a bipolar transistor is used in place of a MOSFET, the controller will control the base current and not the voltage. The reader will understand this difference and any reference to controlling gate voltage in a MOSFET should also be understood to be a disclosure of an equivalent control of base current in a bipolar device.

As mentioned, the invention may provide an SSPIR in each phase of the motor, and the monitoring arrangement and a control arrangement will control each SSPIR independently. Thus, the current waveform in each phase may be monitored so that each SSPIR is safely shut down.

The control arrangement initiates the opening of the SSPIRs when a fault event is triggered. It is envisaged that this may be triggered by a variety of different events.

The control arrangement may include an integrated circuit Mosfet driver. One exemplary driver is the A6861 N-Channel I power MOSFET driver manufactured by Allegro Microsystems, LLC which is capable of controlling MOSFETs connected as a 3-phase solid state relay in phase-isolation applications. It has three independent floating gate drive outputs to maintain the power MOSFETs in the on state over the full supply range with high phase-voltage slew rates. An integrated charge pump regulator provides the above battery supply voltage necessary to maintain the power MOSFETs in the on state continuously when the phase voltage is equal to the battery voltage.

According to a second aspect the disclosure provides a method of driving a motor of the kind having multiple phases, each phase being connected to a bridge driver through a respective solid state phase isolation relay (SSPIR). In one exemplary arrangement, the method comprises, in the event of a fault event in a switch of the bridge driver performing the following steps in order:

monitoring a current waveform in a phase of the motor to identify when the current is within a safe operational area in which it is safe to open the SSPIR of that phase without causing damage due to the SSPIR due to an avalanche mode, the safe operational area comprising a period of time in which both the current flowing in the motor phase is in the opposite direction to a body diode of the SSPIR and the magnitude of the current is below a safe threshold level, and initiating opening of the SSPIR only at the identified time when the current is in the safe operational area and not when the current flowing in the phase is both flowing in the motor phase in the opposite direction as the body diode of the SSPIR and the magnitude of the current is above a safe threshold level.

The method may comprise monitoring the current waveform flowing in each phase, or monitoring a signal that is a function of the current waveform, to detect when the current has passed a peak, and opening the SSPIR once the peak has been passed.

The method may comprise monitoring the current waveform indirectly by monitoring the voltage dropped across the SSPIR. This voltage will be dependent on the current and the resistance of the SSPIR, but by holding the resistance relatively constant or ensuring that it is gradually rising, any negative change in voltage will be a function of a negative change in current and indicate a safe time to open.

BRIEF DESCRIPTION OF DRAWINGS

There will now be described, by way of example only, three exemplary arrangements of the present disclosure with reference to and as illustrated in the accompanying drawings of which.

DETAILED DESCRIPTION

Figure 9:
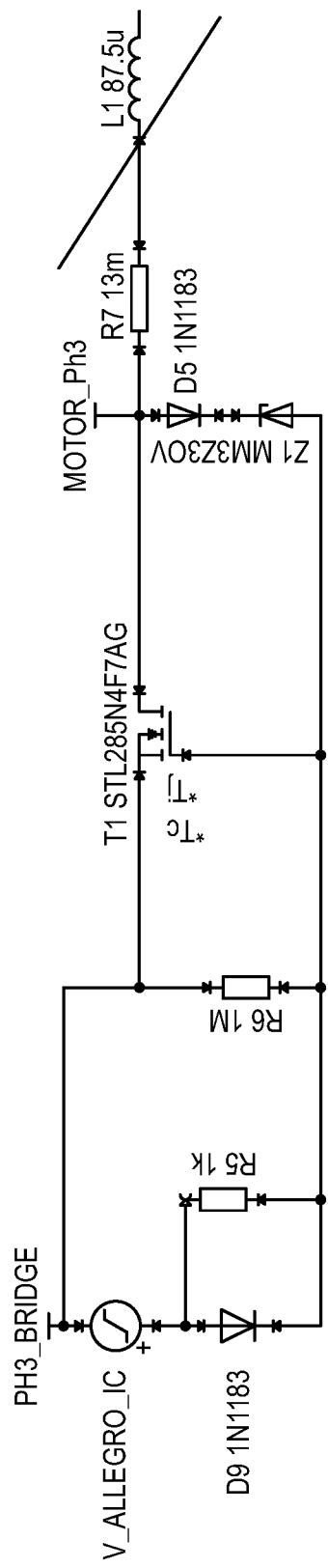
FIG. 9 is a circuit diagram of a first exemplary arrangement of a control circuit for use in the motor drive circuit of FIG. 7.
Figure 10:
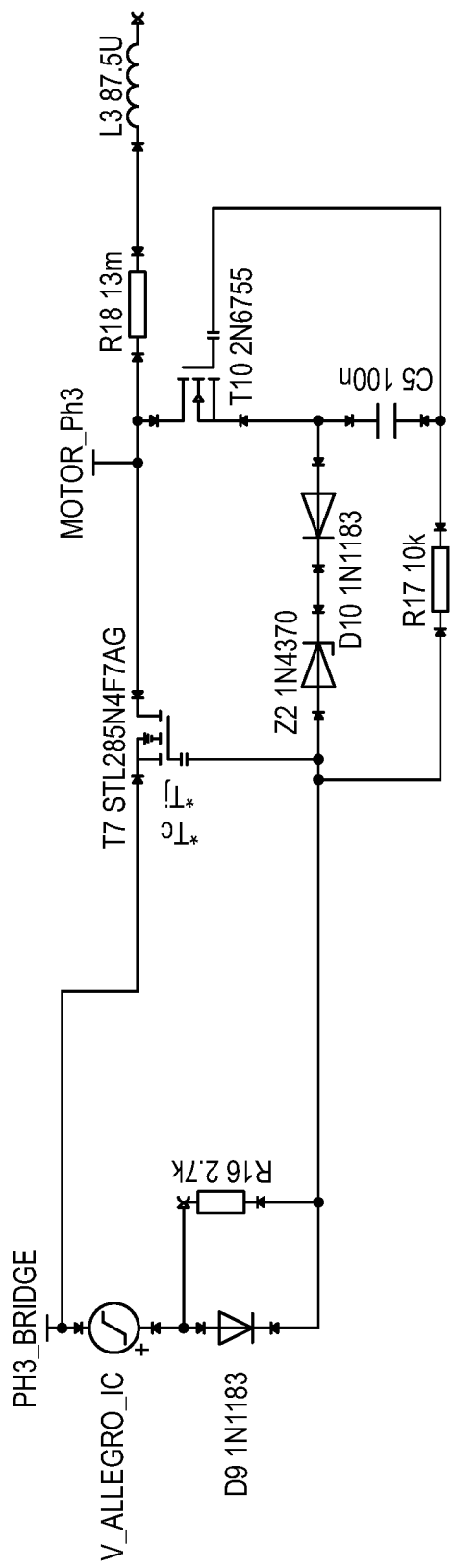
FIG. 10 is a circuit diagram of a second exemplary arrangement of a control circuit for use in the motor drive circuit of FIG. 7.

FIGS. 9 and 10 show two different exemplary arrangements that fall within the scope of the present disclosure. The skilled person will understand that these are not exhaustive and that other circuits may be provided, and modifications to the illustrated circuits made, within the scope of the claims.

Figure 7:
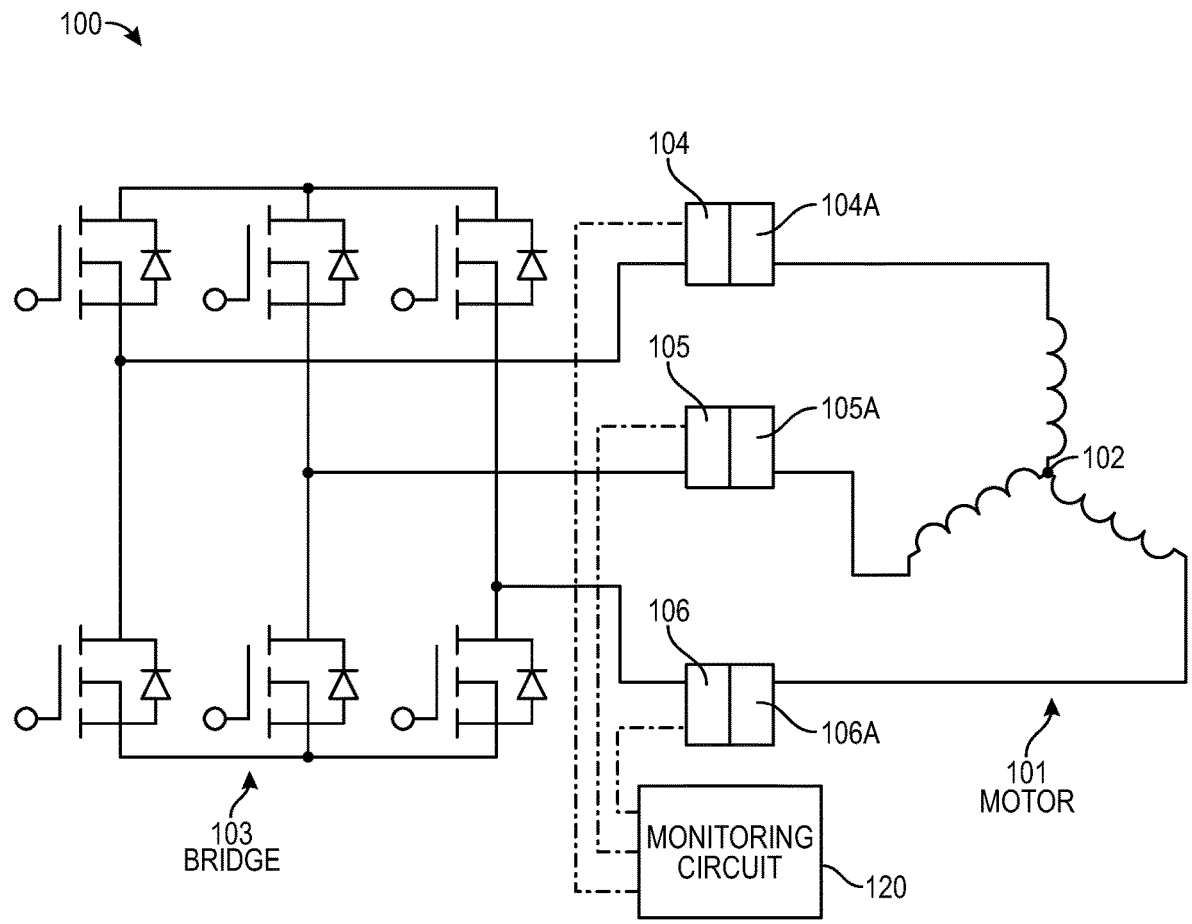
FIG. 7 is a schematic of an exemplary arrangement of a motor drive circuit according to a first aspect of the present disclosure connected to a motor.

As shown in FIG. 7 which is an overview of a generic exemplary arrangement of the disclosure a motor drive circuit 100 for use in an electric power assisted steering system is shown. A motor 101 comprises a three-phase motor, having three phase U, V and W connected at a common star point 102. The ends of each phase, not connected at the star point, are connected to respective branches of a motor bridge circuit 103 via a plurality of solid-state phase isolation relays (SSPIRs) 104,105,106, one in series with each phase.

Figure 2:
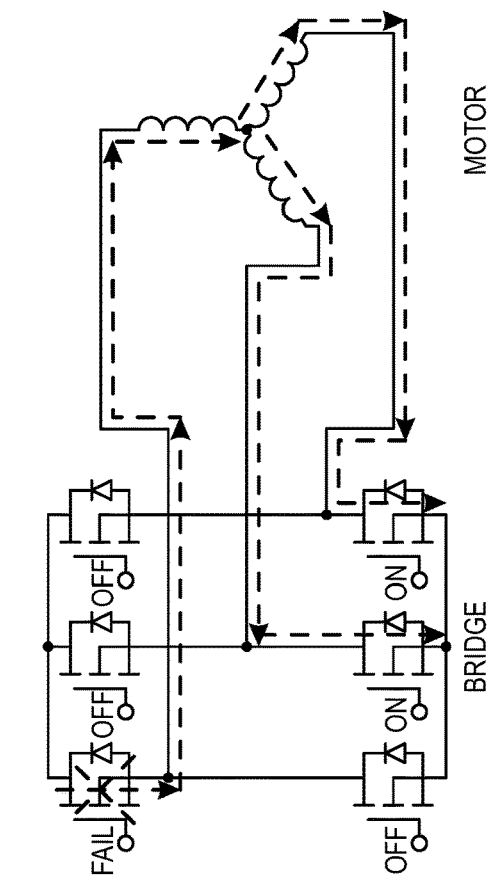
FIG. 2 is a schematic corresponding to FIG. 1 showing the potential path of current flowing round the motor when one of the switches on a high side of the bridge is faulty.
Figure 1:
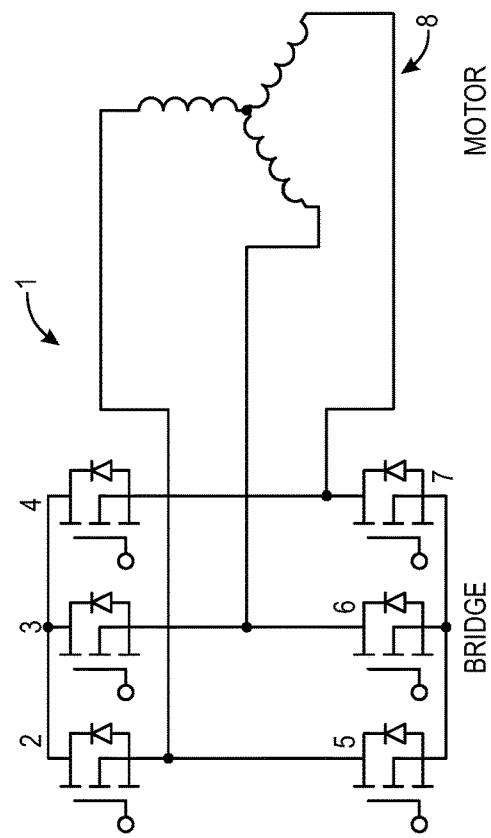
FIG. 1 is a general schematic representation of a prior art motor circuit for use in an automotive electric power assisted steering system.
Figure 4:
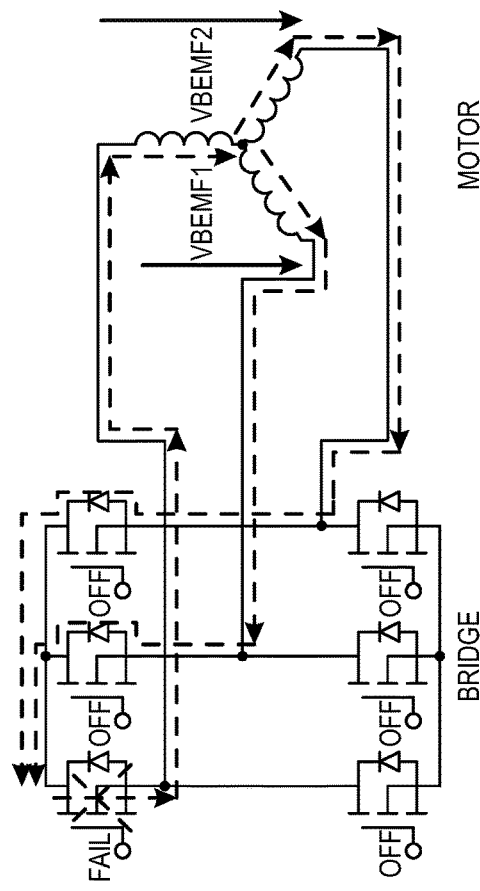
FIG. 4 is a schematic also corresponding to FIG. 1 showing a further source of current flow due to back emf in the motor as it is rotated at speed.
Figure 3:
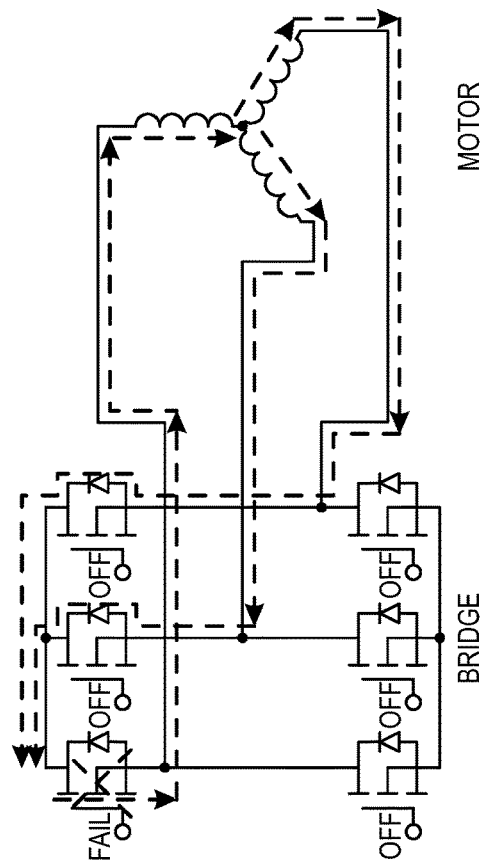
FIG. 3 is a schematic corresponding to FIG. 1 showing an alternative path for current to flow even after the bridge has been closed caused by inductive decay of current in the motor associated with the motor inductance.
Figure 6:
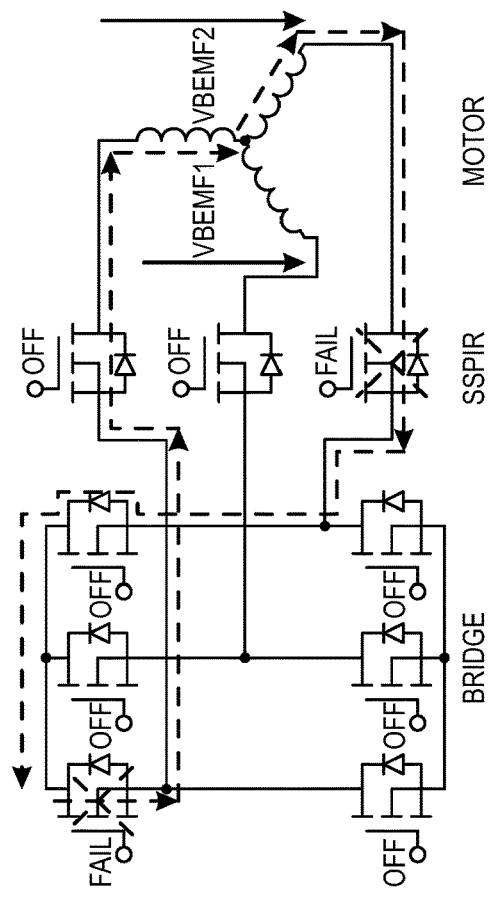
FIG. 6 is a schematic corresponding to FIG. 5 showing a path for current flow due to back emf in the motor even when the bridge is closed.
Figure 5:
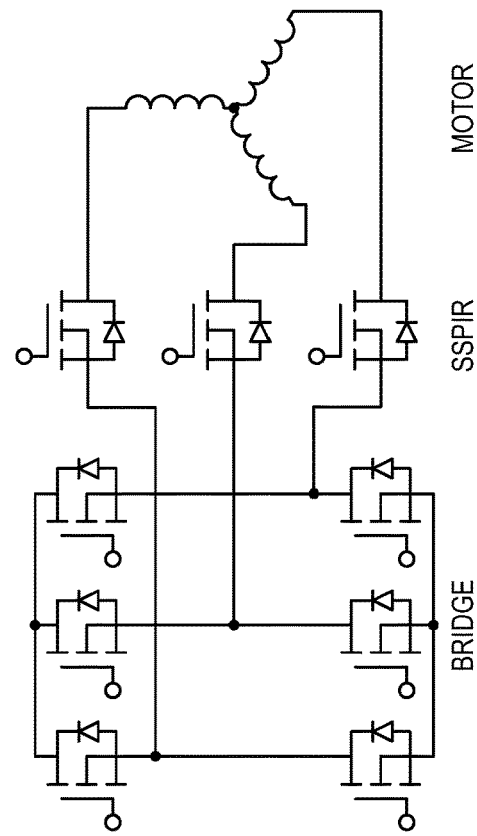
FIG. 5 is a schematic of an alternative prior art circuit in which each phase of the motor is protected by a serially connected switch SSPIR between the motor phase and the bridge.

The motor bridge circuit will typically be in line with that shown in FIG. 1. Each arm or branch comprises an upper portion which connects the motor to a positive side of a battery supply through a top MOSFET switch, and a lower portion which connects the motor phases to a negative side of the battery supply through a bottom MOSFET switch. The top and bottom switches in each arm enable the phase to be connected to the positive side by closing a top transistor and simultaneously opening the bottom one. They also enable it to be connected to the earth by closing the bottom transistor and simultaneously opening the top one. Similarly, they allow the phase to be left floating by simultaneously opening both the top and bottom transistors.

The opening and closing of the top and bottom MOSFETs of the bridge is controlled by a switching pattern applied to the switches by a control circuit (not shown) which is based upon a microprocessor and bridge driver. The pattern indicates whether each of the switches should be opened and closed at any time. Where MOSFET switches are used as illustrated, the pattern may simply comprise a positive voltage applied between Gate-Source terminals of the transistor to close it, or zero voltage between Gate-Source terminals when the switch is to be closed. The choice of switching pattern depends on the position of the motor at any given time, the desired motor torque that is to be achieved, and the desired motor speed. Provided that the motor position and speed are measured and fed to the microprocessor, together with a torque demand signal indicative of the torque required from the motor. These measurements and signals are processed by the microprocessor to produce the desired patterns. Additional signals may be used to determine the desired inverter switching pattern. Such a control circuit is well known in the art, and so will not be discussed here in any detail.

Associated with the bridge is a monitoring circuit 120. This comprises a monitoring arrangement that determines an event in which a switch of the bridge is faulty and includes a bridge shutdown control arrangement that, upon receiving a signal from the first monitoring arrangement indicating that a switch of the bridge is faulty, opens the remaining switches of the bridge. The monitoring arrangement also monitors the current flowing in each phase of the bridge and as will be described hereinafter determines when the current is in a safe operating window for opening of the SSPIRs.

Each SSPIR is a solid-state switch 104, 105, 106 that comprises a MOSFET transistor and has an associated control circuit 104a, 105a, 106a. As shown there are three separate control circuits, one per SSPIR although in practice some of the components of the control circuits may be shared with other control circuits. The three together can be considered to form a single control circuit.

*** In use each SSPIR is normally closed (drain-source conductive) due to a voltage applied to the gate of the SSPIR by the control circuit. The control circuit is largely an analogue circuit made up of discrete components although the voltage that is applied to the gate by the control circuit may be sourced from an output of a suitable integrated circuit. An example of a suitable integrated circuit for use with a three-phase motor is the A6861 N-Channel I power MOSFET driver manufactured by Allegro Microsystems, LLC. This is a dedicated integrated circuit specifically designed for this purpose.

For convenience the operation of a single control circuit and associated SSPIR is given below, the two others working the same way.

The control circuit functions to hold the SSPIR closed in the normal mode of operation and open it safely when a fault event is triggered. The control circuit responds to an output signal from a respective monitoring circuit 113 that monitors a signal that is a function of the current flowing through the SSPIR to identify a safe time to open. i.e., when the current is in a safe operational area. Thus, the SSPIR is only opened by the control circuit 108 when it is safe to do so, defined as a time when the current and voltage across the SSPIR will not reach a level which, if enduring for long enough, will cause the SSPIR to enter avalanche breakdown.

The operation of the control circuit 108 and monitoring circuit 113 will now be explained in more detail, with reference to the detailed circuits diagrams shown in the accompanying Figures. Each figure shows a slightly different embodiment in which the electrical components and the topology of the control circuit part of the motor drive circuit are different. The remainder of the motor drive circuit remains the same however in each of the embodiments. Note that each control circuit comprises only simple passive components except for the integrated circuit that receives the signals from the monitoring circuit and provides the voltage for the gate of the SSPIR.

In normal operation the diagnostic means simply watches the bridge, and the control circuit applies a voltage to the grate of the SSPIR sufficient to keep it closed.

If a MOSFET is identified is a faulty the shutdown control means forces all the other MOSFETS of that half of the bridge to an open (non-conducting condition). This is a first stage of protection of the motor, an initiation of a shutdown event. After that event has been initiated the control circuit acts to open the SSPIRs to give additional protection but only when it is determined that it is safe to do so. This two-stage, controlled opening of switches ensures that a high degree of protection is given with a low risk of damage to the switches. Note that in at least one embodiment the first stage—forcing open half of the bridge can be omitted.

Figure 8:
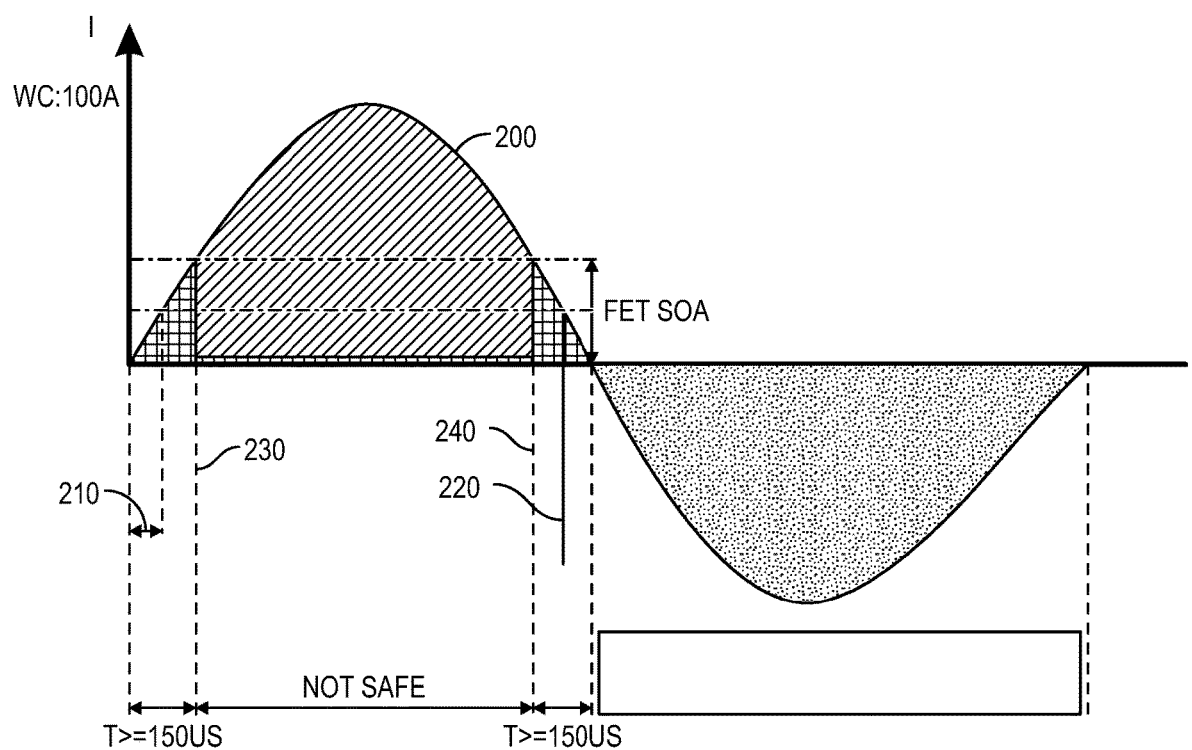
FIG. 8 is a plot of phase current against time as a motor is rotated showing the safe operational area in which the motor circuit of FIG. 7 opens the SSPIR safely.

FIG. 8 is a plot of motor current against time for a case where there is a fault and the motor is rotating to generate a back emf in the phase. This back emf causes a sinusoidal current to flow, with the current in the first half of illustrated waveform flowing in the opposite direction to the body diode of the SSPIR and in the second half slowing in the same direction as the body diode. Two safe operational areas can be defined in the first half cycle where the level of the current is low enough to safely open the SSPIR without generating a voltage spike that will damage the SSPIR. These are labelled 210,220. Between these the current is too high for safe switching of the SSPIR. The entire second half of the cycle is also a safe region for switching as discussed in EP2112051B1.

Following initiation of a fault event, immediately after the bridge switches have been opened, the control circuit initiates the opening of the SSPIR 109 by removal of the gate voltage that had until then kept the SSPIR closed but only when the monitoring circuit determines that the current is in either one of the safe operational zones. The function of the circuit after that event varies slightly between the three embodiments, and each will now be described in more detail.

Embodiment 1—Zener Voltage Clamp

As shown in FIG. 9, the voltage output from the integrated circuit (ic) is passed through a protective diode to the gate of the SSPIR. During normal operation this voltage is chosen to be high enough to hold the SSPIR closed allowing relatively unimpeded flow of current from the source to the drain (and vice versa) of the SSPIR. This voltage is also applied to one side of a Zener diode which is turn is connected in series through a diode to the drain of the SSPIR. The Zener diodes are connected nose to nose so that the diode prevents current flowing through the Zener diode to the drain during normal operation of the motor drive circuit.

Once the opening of the SSPIR is initiated the first step is for the integrated circuit to remove the voltage that is normally applied to the gate, or at least dropping this to a level insufficient to close the SSPIR. For convenience zero voltage may be provided at the output of the integrated circuit at this time. This in turn drops the voltage at the base of the Zener to zero. In this condition the spike of energy from the motor phase winding is prevented from applying a damagingly high voltage across the internal diode of the SSPIR as it is clamped to the Zener voltage. Current flows through the diode and the Zener diode instead of through the SSPIR. The Zener voltage needs to be relatively high to prevent damage to the Zener diode at high motor speeds in this circuit design and to provide a useful increase in the safe operational area.

The circuit also includes a resistor having a very high resistance connecting the gate of the SSPIR to the source. This provides a slow discharge path for the gate of the MOSFET so it is ensured that SSPIR turns-off even without active control signal discharging the gate, i.e. if the circuit is unpowered. This otherwise has no effect on the operation of the circuit and could be omitted if preferred.

This circuit allows the safe operating area in which the switch can be opened to be increased compared to an SSPIR without clamping. FIG. 8 shows the increase in that area to include the regions 230,204. However, this does enable the SSPIR to be opened at any time when the current is flowing in the opposite direction to the body diode of the SSPIR. If the current is sufficiently large the spike in voltage as the SSPIR is suddenly opened may be too much for the Zener diode causing that diode to fail or the SSPIR to be damaged. The Zener voltage should be chosen to be as large as possible but must always be chosen to be lower than the voltage at which the SSPIR will fail so there remains a risk.

Embodiment 2—Zener Diode Clamp with Time Delayed Isolation

FIG. 10 shows an alternative arrangement of control circuit. The basic operation is the same as for FIG. 9 but additional components are included which isolate the Zener diode after a set period of time. This allows a Zener diode to be used with a lower Zener voltage without the SSPIR being accidentally turned back on when back emf from the motor is present.

In the circuit of FIG. 10, the voltage output from the integrated circuit (ic) is passed through a protective diode to the gate of the SSPIR the same as the circuit of FIG. 10. During normal operation this voltage is chosen to be high enough to hold the SSPIR closed allowing relatively unimpeded flow of current from the source to the drain (and vice versa) of the SSPIR. This voltage is also applied to one side of a Zener diode which is turn is connected in series through a diode to the drain of the SSPIR. The Zener diodes are connected cathode to cathode so that the diode prevents current flowing through the Zener diode to the drain during normal operation of the motor drive circuit. Unlike the circuit of FIG. 9, an additional switch is placed in series between the diode and the motor phase.

The switch comprises a MOSFET or similar in which the gate is connected through an RC charging circuit to the voltage at the gate of the SSPIR. During normal operation with the SSPIR closed the capacitor of the RC circuit is fully charged and the full voltage from the gate is dropped across the capacitor. Current does not flow through the resistor in this condition and so the gate voltage of the SSPIR is applied to the gate of the additional MOSFET holding it closed. The diode is therefore connected to the drain of the SSPIR in the same way it is connected in the circuit of FIG. 9.

When the SSPIR is closed, the voltage at the gate of the SSPIR is dropped to zero and the voltage applied to the resistor of the RC circuit drops to zero. The capacitor discharge through the resistor at a rate set by the RC constant of the RC circuit until the voltage across the capacitor drops to zero and the gate voltage of the additional MOSFET also drops to zero causing the MOSFET to open isolating the whole control circuit and in particular the Zener clamp from the motor phase.

By choosing a time constant that is relatively short, the Zener diode will be disconnected from the motor phase before the back emf from the motor can turn on the SSPIR by raising the gate voltage when the current flows in the opposite direction the SSPIR body diode. The Zener voltage can be smaller.

Note that in this second circuit embodiment the resistor connecting the gate of the SSPIR to the source of the SSPIR is not needed.

The skilled person will appreciate that the motor drive circuit and method described herein in the context of the disclosure overcomes shortcomings in the prior art by determining when the current flowing through the MOSFETs is within a safe operational area. The value of the current limit depends on several factors such as component selection, design parameters, temperature, etc. The turn off event can be triggered by determining whether or not the phase current is in the safe operating area. This can be achieved by various methods like current measurement, lookup table based on motor position and speed and the like.

It will be understood that the above examples are not intended to be limiting to the scope of protection. For instance, whilst the example uses MOSFETs as the SSPIRs a bipolar transistor could be used. In that case, rather than varying the gate voltage the control means would vary the base current.

The invention claimed is:

1. A motor drive circuit for use in driving a motor having two or more phases, the motor drive circuit comprising:
   a motor bridge having, for each phase of the motor, a bridge arm comprising an upper switch and a lower switch that in normal operation may be opened and closed to modulate voltage applied to the respective phases in response to drive signals from a motor control circuit,
   at least one solid state phase isolation relay (SSPIR) that is provided in series in an electrical path connecting a respective phase of the motor to a respective bridge arm, the SSPIR being closed in normal operation so that current can flow in the phase and is held open in a fault mode of operation to prevent the flow of current in the phase,
   a monitoring arrangement for monitoring a current waveform in the phase to identify when the current is within a safe operational area in which it is safe to open the SSPIR without causing damage to the SSPIR due to an avalanche mode, the safe operational area comprising a period of time in which both the current flowing in the motor phase is in the opposite direction to a body diode of the SSPIR and the magnitude of the current is below a safe threshold level, and
   a control circuit that during normal operation applies a voltage to each SSPIR that is sufficient to hold the SSPIR closed, in which the motor drive circuit is arranged such that the SPPIR is only opened at a time when the current is in the safe operational area and not when the current flowing in the phase is both flowing in the motor phase in the opposite direction as the body diode of the SSPIR and the magnitude of the current is above a safe threshold level.

2. A motor drive circuit according to claim 1 in which the monitoring arrangement further comprises a bridge monitor circuit that monitors the condition of the motor bridge to determine that a fault condition is present where a switch of the bridge is not operating correctly and in response outputs a fault signal that is fed to the current control circuit to initiate an opening of the at least one SSPIR at an appropriate time when the conditions of the safe operational area are satisfied.

3. A motor drive circuit according to claim 2 in which in an event that the bridge monitor circuit detects a fault it immediately outputs the fault signal and the monitor arrangement delays a time at which the fault signal is fed to the control circuit until the current in the phase of the at least one SSPIR is in the safe operational area.

4. A motor drive circuit according to claim 3, wherein the control circuit normally applies a positive voltage to the SSPIR to hold the SSPIR closed and upon receipt of the fault signal applies a lower or zero voltage to the SSPIR to initiate the opening of the SSPIR.

5. A motor drive circuit according to claim 3, wherein the control circuit includes a voltage clamp which is configured to clamp the voltage at a drain of the SSPIR to a safe level insufficient to cause failure of the SSPIR following an initiation of the opening of the SSPIR thereby extending a width of the safe operational area by increasing a maximum phase current at which the SSPIR can be safely opened.

6. A motor drive circuit according to claim 5 in which the voltage at the drain is clamped to a level below that which will cause damage to the SSPIR but above a maximum phase voltage that is expected due to back emf from rotation of the motor.

7. A motor drive circuit according to claim 1, wherein the control circuit normally applies a positive voltage to the SSPIR to hold the SSPIR closed and upon receipt of the fault signal applies a lower or zero voltage to the SSPIR to initiate the opening of the SSPIR.

8. A motor drive circuit according to in claim 1, wherein the control circuit includes a voltage clamp which is configured to clamp the voltage at a drain of the SSPIR to a safe level insufficient to cause failure of the SSPIR following an initiation of the opening of the SSPIR thereby extending a width of the safe operational area by increasing a maximum phase current at which the SSPIR can be safely opened.

9. A motor drive circuit according to claim 8 in which the voltage at the drain is clamped to a level below that which will cause damage to the SSPIR but above a maximum phase voltage that is expected due to back emf from rotation of the motor.

10. A motor circuit according to claim 9 in which the voltage clamp circuit comprises at least one Zener diode which is connected in series between the drain and the gate of the SSPIR.

11. A motor drive circuit according to claim 10 in which the control circuit includes a resistor that connects the gate of the SSPIR to a source of the SSPIR to fix a source voltage to a gate voltage.

12. A motor circuit according to claim 8 in which the voltage clamp circuit comprises at least one Zener diode which is connected in series between the drain and the gate of the SSPIR.

13. A motor drive circuit according to claim 12 in which the control circuit includes a resistor that connects the gate of the SSPIR to a source of the SSPIR to fix a source voltage to a gate voltage.

14. A method of driving a motor that has multiple phases, each phase of the motor being connected to a bridge driver through a respective solid state phase isolation relay (SSPIR), the method comprising, in an event of a fault event in a switch of the bridge driver performing the following steps in order:

monitoring a current waveform in a phase of the motor to identify when the current is within a safe operational area in which it is safe to open the SSPIR of that phase without causing damage to the SSPIR due to an avalanche mode, the safe operational area comprising a period of time in which both the current flowing in the motor phase is in the opposite direction to a body diode of the SSPIR and a magnitude of the current is below a safe threshold level, and initiating opening of the SSPIR only at an identified time when the current is in the safe operational area and not when the current flowing in the phase is both flowing in the motor phase in the opposite direction as the body diode of the SSPIR and the magnitude of the current is above a safe threshold level.

* * * * *